(12) United States Patent
Deng

(10) Patent No.: US 10,909,572 B2
(45) Date of Patent: Feb. 2, 2021

(54) REAL-TIME FINANCIAL SYSTEM ADS SHARING SYSTEM

(71) Applicant: Houtao Deng, Sunnyvale, CA (US)

(72) Inventor: Houtao Deng, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 1006 days.

(21) Appl. No.: 14/469,238

(22) Filed: Aug. 26, 2014

(65) Prior Publication Data
US 2016/0063545 A1 Mar. 3, 2016

(51) Int. Cl.
*G06Q 30/02* (2012.01)
*G06Q 40/00* (2012.01)

(52) U.S. Cl.
CPC ..... *G06Q 30/0255* (2013.01); *G06Q 30/0254* (2013.01); *G06Q 40/12* (2013.12)

(58) Field of Classification Search
None
See application file for complete search history.

(56) References Cited

U.S. PATENT DOCUMENTS

| | | | | |
|---|---|---|---|---|
| 8,234,195 B1* | 7/2012 | Berhanu | ................ | G06Q 40/02 705/35 |
| 10,438,269 B2* | 10/2019 | Merz | ................ | G06Q 30/0631 |
| 10,482,497 B2* | 11/2019 | Poole | ................ | G06Q 30/0255 |
| 10,607,219 B2* | 3/2020 | Ciurea | ................ | G07F 9/009 |
| 10,672,008 B2* | 6/2020 | Braff | ................ | G06Q 40/00 |
| 2006/0074780 A1* | 4/2006 | Taylor | ................ | G06Q 30/0601 705/35 |
| 2009/0063249 A1* | 3/2009 | Tomlin | ................ | G06Q 30/02 705/7.34 |
| 2010/0106568 A1* | 4/2010 | Grimes | ................ | G06Q 30/0254 705/14.1 |
| 2011/0077951 A1* | 3/2011 | Tullis | ................ | G06Q 30/02 705/1.1 |
| 2011/0231257 A1* | 9/2011 | Winters | ................ | G06Q 30/0255 705/14.53 |
| 2012/0066045 A1* | 3/2012 | Schmitt | ................ | G06Q 30/02 705/14.25 |

(Continued)

FOREIGN PATENT DOCUMENTS

CA  2777172 A1 * 4/2011 ......... G06Q 30/0267

OTHER PUBLICATIONS

Hsinchun Chen, Chiang, R. H. L. and Storey, V. C. (2012) 'Business Intelligence and Analytics: From Big Data to Big Impact', MIS Quarterly, 36(4), pp. 1165-1188. doi: 10.2307/41703503. (Year: 2012).*

(Continued)

*Primary Examiner* — Abhishek Vyas
*Assistant Examiner* — Scott Snider
(74) *Attorney, Agent, or Firm* — Ferguson Braswell Fraser Kubasta PC

(57) ABSTRACT

A method, system, and computer readable medium for automatically selecting target consumers and delivering business-initiated messages to the selected target consumers, as well as automatically selecting target businesses and delivering consumer-initiated messages to the selected target businesses. In particular, financial management applications used by the businesses and consumers are employed in targeting and delivering the business-initiated messages and consumer-initiated messages.

15 Claims, 8 Drawing Sheets

(56) References Cited

U.S. PATENT DOCUMENTS

2012/0158500 A1* 6/2012 Hochstatter ........ G06Q 30/0255
705/14.53
2013/0151345 A1* 6/2013 Brelig .................... G06Q 30/02
705/14.66

OTHER PUBLICATIONS

Brdjanin, D. and Maric, S. (2005) 'UML-business profile-based Business Modeling in Iterative-Incremental Software Development', EUROCON 2005—The International Conference on 'Computer as a Tool', Computer as a Tool, 2005. EUROCON 2005.The International Conference on, 2, pp. 1263-1266. (Year: 2005).*
Kodialam, M., Lakshman, T. V. and Mukherjee, S. (2012) 'Effective ad targeting with concealed profiles', 2012 Proceedings IEEE INFOCOM, INFOCOM, 2012 Proceedings IEEE, pp. 2237-2245. doi: 10.1109/INFCOM.2012.6195609. (Year: 2012).*
Extended European Search Report for Extended European Search Report for Application No. 14191243.6, dated Jul. 31, 2015, 8 pages.

* cited by examiner

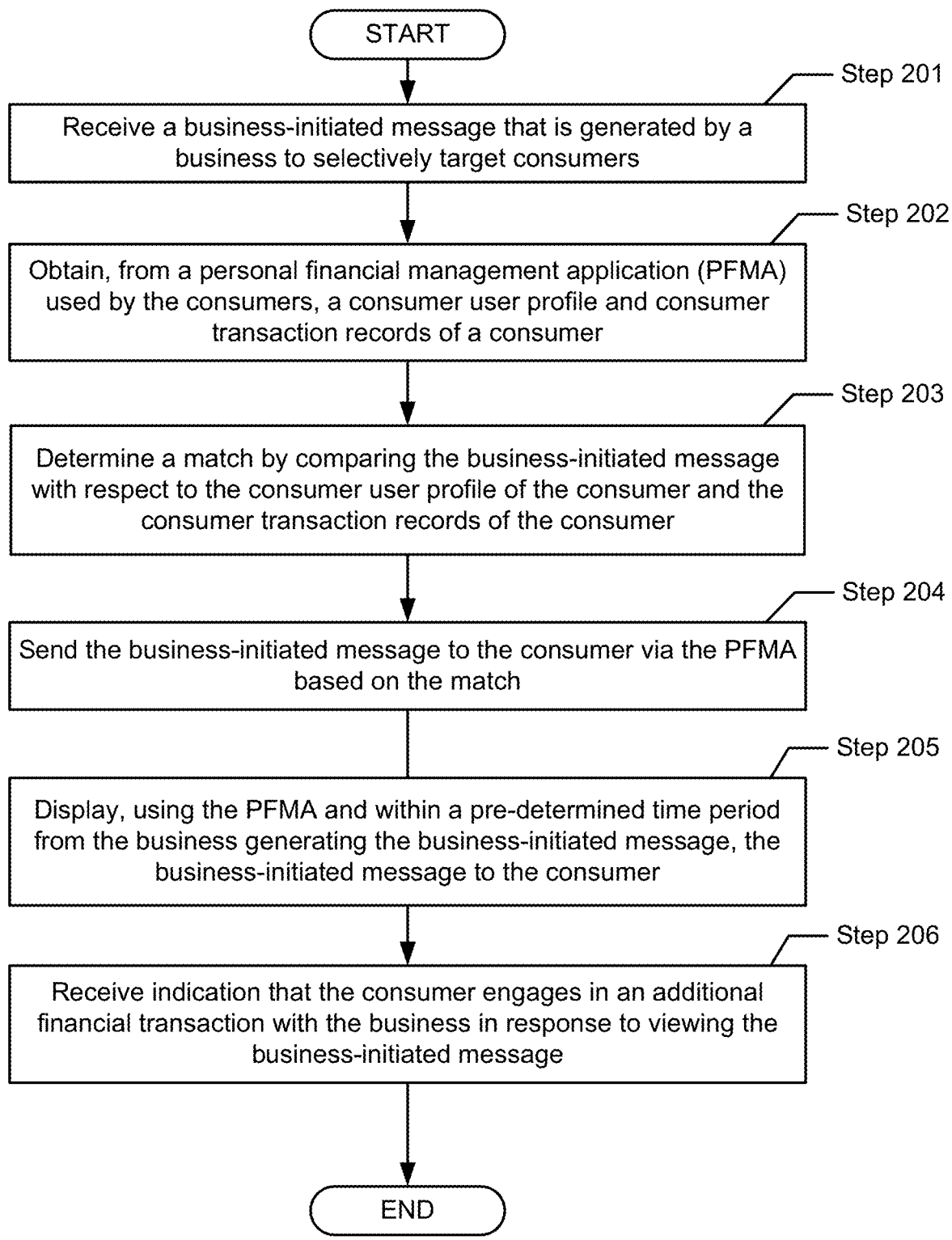
FIG. 2.1

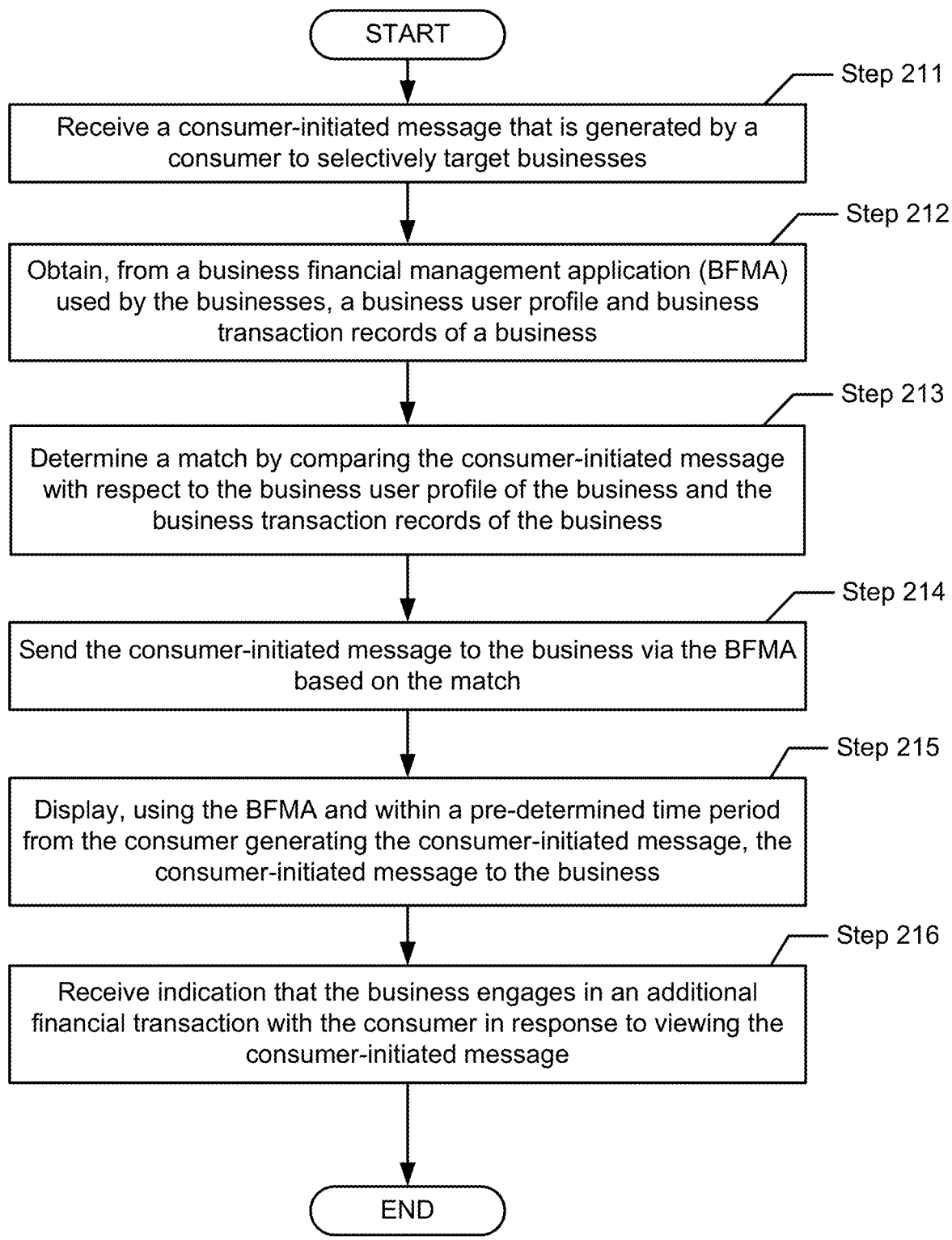
FIG. 2.2

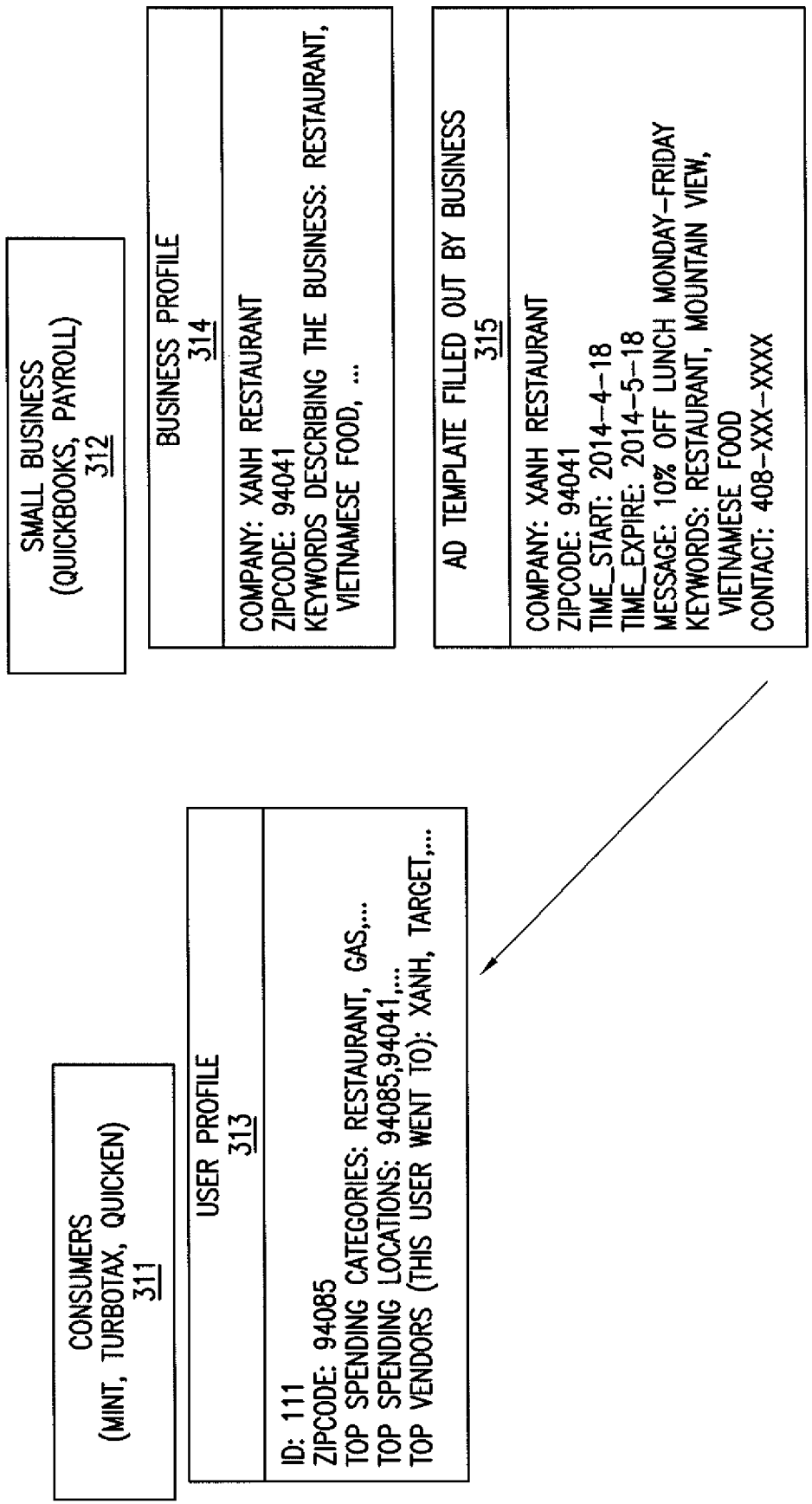
FIG.3.1

SCREENSHOT A
320 chriss@123.com

Mint.com

321

| DATE | DESCRIPTION | CATEGORY | AMOUNT | LOCATION |
|---|---|---|---|---|
| 07/20/12 | Costco | Groceries | $10.49 | Sunnyvale |
| 07/22/12 | Nordstrom | Clothing | $64.95 | San Jose |
| 08/01/14 | Xanh | Restaurants | $48 | Mountain view |
| 08/02/14 | Sakoon | Restaurants | $56 | Mountain view |
| 08/03/14 | livin | Restaurants | $23 | Mountain view |
| ... | ... | ... | ... | ... |

322

VENDOR'S AD

| TIME_START | TIME_EXPIRE | MESSAGE | KEYWORDS | CONTACT | LOCATION |
|---|---|---|---|---|---|
| 2014-8-04 | 2014-8-13 | 10% off lunch | Restaurants Mountain view | 408-XXX-XXXX | Mountain view |

FIG.3.2

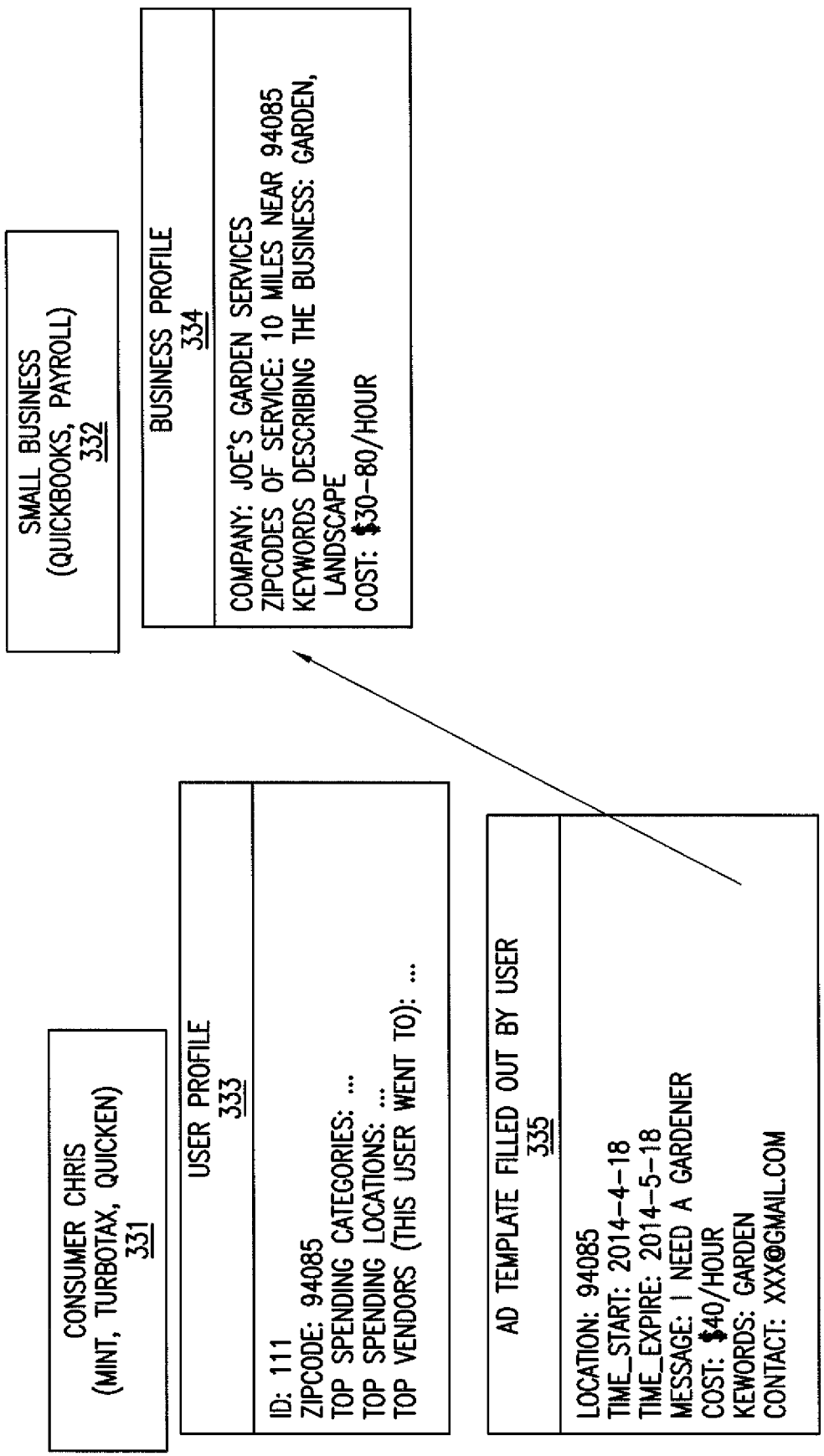
FIG.3.3

SCREENSHOT B
340

QuickBooks                                                    Joe's Garden Services

| PAYMENTS | | | 341 | |
|---|---|---|---|---|
| DATE | CUSTOMER | AMOUNT | | DESCRIPTION |
| 2012-10-1 | John | $45 | | Garden services, 1 hour, Mountain view |
| 2014-1-2 | Tom | $50 | | Garden services, 1.5 hours, Palo Alto |
| 2014-8-1 | Jack | $100 | | Garden services, 2 hours, San Jose |
| ... | | | | |

| CUSTOMER'S AD | | | | 342 | | | |
|---|---|---|---|---|---|---|---|
| TIME_START | TIME_EXPIRE | MESSAGE | PRICE | KEYWORDS | CONTACT | LOCATION |
| 2014-8-04 | 2014-8-3 | I need a gardener | $40/hour | Garden | John@123.com | Mountain view |
| 2014-8-04 | 2014-8-4 | N/A | $35/hour | N/A | Bill@test.com | Palo Alto |

REAL-TIME FINANCIAL SYSTEM ADS SHARING SYSTEM

BACKGROUND

Financial transactions between a business and a consumer typically include the providing of goods and/or services (collectively referred to as merchandise) by the business in exchange for payment from the consumer. The business may use a business financial management application to track the financial transactions associated with many consumers and, subsequently, the business's revenue or other operating results. The consumer may use a personal financial management application to track the financial transactions associated with many businesses/merchants and, subsequently, the consumer's spending habits. In order to assist the consumer, the financial management application may categorize financial transactions into categories. Thus, for example, a consumer may be able to determine the amount that the consumer spends on travel as compared to the amount that the consumer spends on utilities.

SUMMARY

In general, in one aspect, the invention relates to a system for targeted communication. The system includes a computer processor, a commerce platform configured to perform a plurality of financial transactions, wherein the plurality of financial transactions comprise payments from a plurality of consumers in exchange for goods and services provided by a plurality of businesses, a financial management server separate from the commerce platform, and a repository for storing a plurality of business-initiated messages from the plurality of businesses. The financial management server includes (i) a personal financial management application (PFMA) used by the plurality of consumers, when executed causing the computer processor to generate a consumer user profile for each of the plurality of consumers, access, based on a consumer user input from a consumer of the plurality of consumers, consumer transaction records representing a portion of the financial transactions associated with the consumer, and display, to the consumer, a business-initiated message received from a targeted communication application (TCA), and (ii) a business financial management application (BFMA) used by the plurality of businesses, when executed causing the computer processor to generate a business user profile for each of the plurality of businesses, and access, based on a business user input from a business of the plurality of businesses, business transaction records representing a portion of the financial transactions associated with the business, wherein the TCA when executed causing the computer processor to receive, from the business, the business-initiated message that is generated by the business to selectively target the plurality of consumers, determine a first match by comparing the business-initiated message with respect to the consumer user profile of the consumer and the consumer transaction records of the consumer, and send the business-initiated message to the consumer via the PFMA based on the first match, wherein the business-initiated message invites the consumer to engage in a first additional financial transaction with the business using the commerce platform.

In general, in one aspect, the invention relates to a method for targeted communication. The method includes receiving, by a computer processor and from a business of a plurality of businesses, a business-initiated message that is generated by the business to selectively target a plurality of consumers, wherein the plurality of businesses and the plurality of consumers conduct a plurality of financial transactions using a commerce platform, wherein the plurality of financial transactions comprise payments from the plurality of consumers in exchange for goods and services provided by the plurality of businesses, obtaining, by the computer processor and from a personal financial management application (PFMA) used by the plurality of consumers to manage the plurality of financial transactions, a consumer user profile and consumer transaction records of a consumer of the plurality of consumers, determining a first match by the computer processor comparing the business-initiated message with respect to the consumer user profile of the consumer and the consumer transaction records of the consumer, and sending the business-initiated message to the consumer via the PFMA based on the first match, wherein the business-initiated message invites the consumer to engage in a first additional financial transaction with the business using the commerce platform.

In general, in one aspect, the invention relates to a non-transitory computer readable medium storing instructions for targeted communication. The instructions, when executed by a computer processor, includes functionality for receiving, from a business of a plurality of businesses, a business-initiated message that is generated by the business to selectively target a plurality of consumers, wherein the plurality of businesses and the plurality of consumers conduct a plurality of financial transactions using a commerce platform, wherein the plurality of financial transactions comprise payments from the plurality of consumers in exchange for goods and services provided by the plurality of businesses, obtaining, from a personal financial management application (PFMA) used by the plurality of consumers to manage the plurality of financial transactions, a consumer user profile and consumer transaction records of a consumer of the plurality of consumers, determining a first match by comparing the business-initiated message with respect to the consumer user profile of the consumer and the consumer transaction records of the consumer, and sending the business-initiated message to the consumer via the PFMA based on the first match, wherein the business-initiated message invites the consumer to engage in a first additional financial transaction with the business using the commerce platform.

Other aspects of the invention will be apparent from the following transaction description and the appended claims.

BRIEF DESCRIPTION OF DRAWINGS

FIGS. 2.1 and 2.2 show a flowchart of a method in accordance with one or more embodiments of the invention.

FIGS. 3.1, 3.2, 3.3, and 3.4 show an example in accordance with one or more embodiments of the invention.

DETAILED DESCRIPTION

Figure 1:
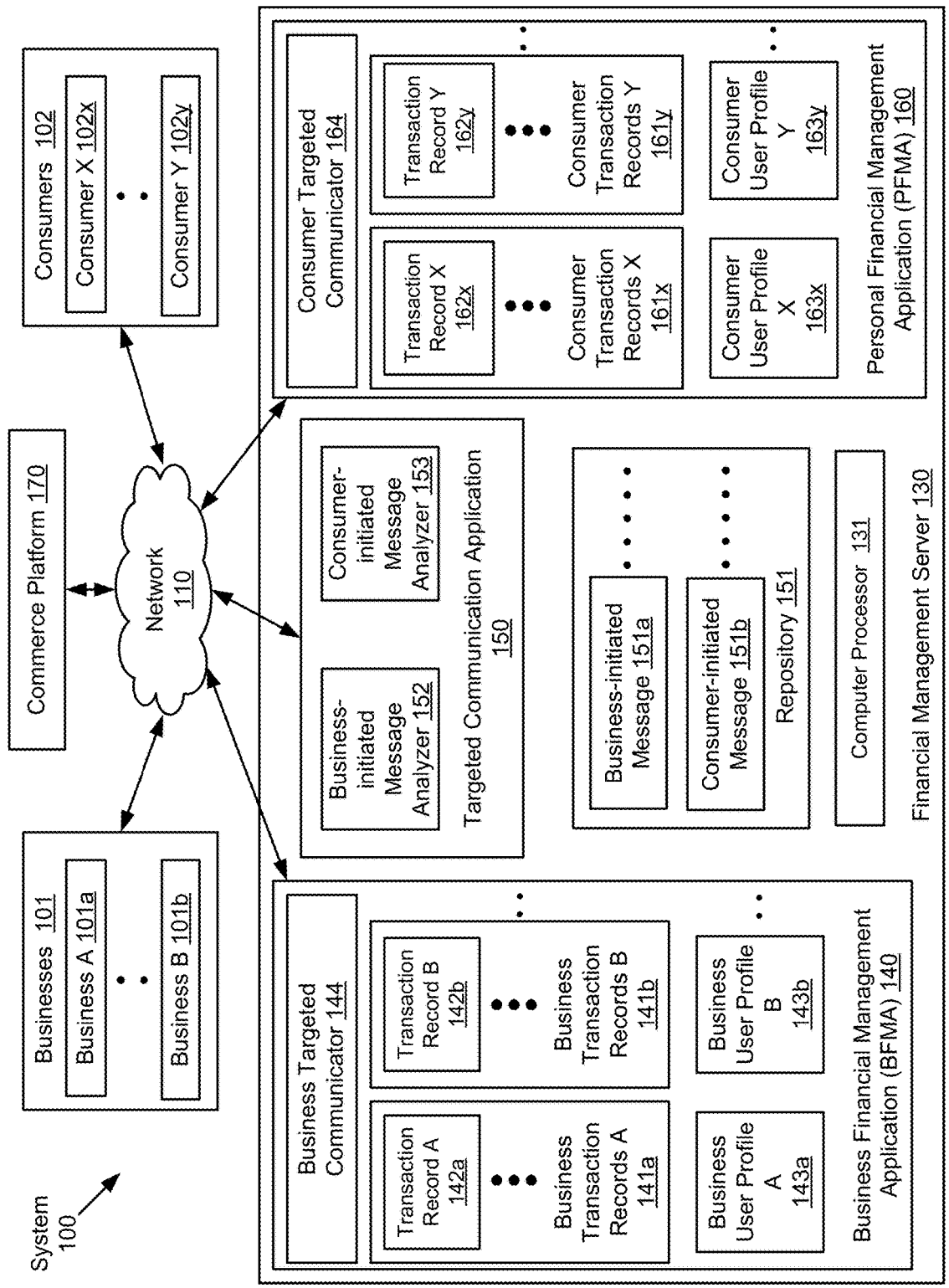
FIG. 1 shows a block diagram of a system in accordance with one or more embodiments of the invention.

Specific embodiments of the invention will now be described in detail with reference to the figures. Like elements in the various figures are denoted by like reference numerals for consistency. Further, in the figures, three collinear dots mean that more elements of the same type as before the three collinear dots may optionally exist in accordance with one or more embodiments of the invention.

In the following detailed transaction description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the transaction description.

In general, embodiments of the invention provide a method, system, and computer readable medium for automatically selecting target consumers and delivering business-initiated messages to the selected target consumers, as well as automatically selecting target businesses and delivering consumer-initiated messages to the selected target businesses. In particular, financial management applications used by the businesses and consumers are employed in targeting and delivering the business-initiated messages and consumer-initiated messages.

FIG. 1 shows a block diagram of a system (100) in accordance with one or more embodiments of the invention. Specifically, the system (100) includes businesses (101) (e.g., business A (101a), business B (101b), etc.), consumers (102) (e.g., consumer X (102x), consumer Y (102y)), a commerce platform (170), and a financial management server (130) that are coupled via a network (110). Further, the financial management server (130) includes a business financial management application (BFMA) (140) used by the businesses (101), a personal financial management application (PFMA) (160) used by the consumers (102), a targeted communication application (TCA) (150), a computer processor (131) for executing these applications, and a repository (151) which store data used and/or generated by these applications. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1.

In one or more embodiments of the invention, each of the consumers (102) (e.g., consumer X (102x), consumer Y (102y)) is an individual consumer. In particular, an individual consumer is a person or group (e.g., family or other organization) that consumes goods and/or services. In one or more embodiments, each of the consumers (102) may include any computing device configured with computing, data storage, and network communication functionalities. For example, the consumer (102a) may be an individual consumer and use the computing device to access the PFMA (160) to manage personal financial information, such as information related to purchasing goods and/or services from the businesses (e.g., business A (101a), business B (101b), etc.).

In one or more embodiments of the invention, each of the businesses (101) (e.g., business A (101a), business B (101b)) is a business entity engaged in the trade of goods, services, or both to the consumers (102). For example, the business entity may be a sole proprietorship, partnership, business, non-profit organization, etc. In one or more embodiments of the invention, the business has a storefront located in at least one physical location. Alternatively or additionally, the business may correspond to an Internet business that has an associated website (referred to as an online store). In one or more embodiments of the invention, the goods and/or services sold by the business correspond to the merchandise sold by the business to the consumers. Further, as used herein, the business is deemed to perform an action when the action is performed on behalf of the business. For example, an owner, agent, or officer may act on behalf of the business to perform an action.

In one or more embodiments of the invention, the facility and other means involved in the trade of goods and/or services between the businesses (101) and consumers (102) are collectively referred to as the commerce platform (170). In one or more embodiments, the commerce platform (170) includes physical stores of the businesses (101) that are visited by the consumers (102). In one or more embodiments, the commerce platform (170) includes electronic commerce (E-commerce) resources, such as mobile commerce, electronic funds transfer, supply chain management, Internet marketing, online transaction processing, electronic data interchange (EDI), inventory management systems, and automated data collection systems.

In one or more embodiments of the invention, each of the businesses (101) (e.g., business A (101a), business B (101b)) includes functionality to perform one or more financial transactions with one or more consumers among the consumers (102). A financial transaction is the exchange of one or more merchandise items (e.g., goods and/or services) for payment. A financial transaction may be a sale of a merchandise item, a return of a merchandise item, a down payment on a merchandise item, or any other exchange of merchandise that involve finances. In one or more embodiments, such financial transactions are performed via the commerce platform (170). Generally, a financial transaction is represented by a business transaction record (e.g., transaction record A (142a), transaction record B (142b)) for the business and a consumer transaction record (e.g., transaction record X (162x), transaction record Y (162y)) for the consumer. The business transaction record describes the financial transaction from the business's point of view, while the consumer transaction record describes the financial transaction from the consumer's point of view.

The business transaction record and the consumer transaction record are generally referred to as transaction records. In one or more embodiments, the transaction record is recorded information regarding the financial transaction. Each transaction record includes a transaction description of the financial transaction. The transaction description describes the financial transaction and may be a concatenation of various components. For example, the transaction description includes information about the business, such as a full or abbreviated name of the business, a location of the business, a store identifier of the business, all or part of a web address for the business, etc. The transaction description further includes information about the purchased merchandise, such as a name, description, or other identifier of the merchandise, purchase price, purchase date, payment, discount, tax, etc.

In one or more embodiments of the invention, the network (110) may include a cellular phone network, a wide area network, a local area network, a public switched telephone network (PSTN), a financial network, any other suitable network that facilitates the exchange of information from one part of the network to another, or a combination thereof. In one or more embodiments, the network (110) is coupled to or overlaps with the Internet.

In one or more embodiments of the invention, the financial management server (130) includes a collection of computing and data storage resources used by the businesses (101) and consumers (102) to manage their financial activities, such as the aforementioned financial transactions. An example of the financial management server (130) is described in reference to FIG. 4 below. In particular, the financial management server (130) includes the computer processor (131) that is configured to execute the PFMA (160), the BFMA (140), and the TCA (150). Further, the financial management server (130) includes the repository (151), which may include a disk drive storage device, a semiconductor storage device, a database management system, other suitable computer data storage device, or combinations thereof. In one or more embodiments, content stored in the repository (151) may be a data file, a linked list, a data sequence, a database, a graphical representation, or any other suitable data structure.

In one or more embodiments of the invention, the repository (151) includes functionality to store data for the PFMA (160), the BFMA (140), and the TCA (150). The data stored in the repository (151) includes business-initiated messages (e.g., business-initiated message (151*a*)) generated by the businesses (101) using the BFMA (140), and consumer-initiated messages (e.g., consumer-initiated message (151*b*)) generated by the consumers (102) using the PFMA (160). In one or more embodiments, the business-initiated message (151*a*) is a message generated by the business A (101*a*) for inviting a target consumer (e.g., selected from the consumers (102)) to engage in a future financial transaction with the business A (101*a*) using the commerce platform (170). For example, the business-initiated message (151*a*) may be an advertisement promoting the business A (101*a*). In one or more embodiments, the consumer-initiated message (151*b*) is a message generated by the consumer X (102*x*) for inviting a target business (e.g., selected from the businesses (101)) to engage in a future financial transaction with the consumer X (102*x*) using the commerce platform (170). For example, the consumer-initiated message (151*b*) may be an inquiry for goods/services desired by the consumer X (102*x*). In one or more embodiments, the business-initiated messages and consumer-initiated messages stored in the repository (151) include real-time business-initiated and/or consumer-initiated messages currently being processed by the TCA (150) as well as historical business-initiated and/or consumer-initiated messages previously processed by the TCA (150). Each of these components of the financial management server (130) is described below.

In one or more embodiments of the invention, the PFMA (160) is a set of software solutions designed to manage financial transactions and other financial needs of the consumers (102). In one or more embodiments of the invention, the PFMA (160) may be a personal financial software, a personal tax preparation application, or any other types of personal financial management application. In one or more embodiments, the PFMA (160) is provided by an application service provider, such as a software as a service (SaaS). For example, the PFMA (160) may be operated by the application service provider (ASP) and accessed by the consumers (102) on a subscription basis. In one or more embodiments, the PFMA (160) retrieves the transaction records (e.g., transaction record X (162*x*) of the consumer X (102*x*), transaction record Y (162*y*) of the consumer Y (102*y*)) from financial institutions (e.g., bank, credit card service provider, etc.) used by the consumers (102).

In one or more embodiments, the PFMA (160) retrieves the transaction records from financial institutions as directed by the consumers (102). For example, the PFMA (160) retrieves the transaction record X (162*x*) of the consumer X (102*x*) based on a consumer user input (e.g., during an online banking session to access the financial institutions) of the consumer X (102*x*). Further, the PFMA (160) stores and organizes the retrieved transaction records as the consumer transaction records under individual financial accounts of the consumers (102). For example, the retrieved transaction records associated with the consumer X (102*x*) are stored as the consumer transaction records X (161*x*) in a financial account (not shown) of the consumer X (102*x*). Similarly, the retrieved transaction records associated with the consumer Y (102*y*) are stored as the consumer transaction records Y (161*y*) in a financial account (not shown) of the consumer Y (102*y*).

In one or more embodiments of the invention, the PFMA (160) is further configured to generate a consumer user profile for each of the consumers (102). In one or more embodiments, the consumer user profile includes one or more of address information, demographic information, transaction statistics, and other descriptions of the corresponding consumer. For example, the PFMA (160) generates the consumer user profile X (163*x*) for the consumer X (102*x*) based on information provided by the consumer X (102*x*) as well as based on the activities of the consumer X (102*x*) using the PFMA (160). Similarly, the PFMA (160) generates the consumer user profile Y (163*y*) for the consumer Y (102*y*) based on information provided by the consumer Y (102*y*) as well as based on the activities of the consumer Y (102*y*) using the PFMA (160).

In one or more embodiments of the invention, the PFMA (160) is further configured to display business-initiated messages (e.g., business-initiated message (151*a*)) received from the TCA (150) to target one or more of the consumers (102). For example, the business-initiated message (151*a*) may be sent from the TCA (150) to an instantiation of the PFMA (160) that executes on a computing device of the consumer X (102*x*). Accordingly, the business-initiated message (151*a*) is displayed in a user interface window of the PFMA (160) that is displayed on the computing device of the consumer X (102*x*). An example of displaying the business-initiated message (151*a*) on the computing device of the consumer X (102*x*) is described in reference to FIG. 3.1 below.

In one or more embodiments of the invention, the BFMA (140) is a set of software solutions designed to manage financial transactions and other financial needs of the businesses (101). In one or more embodiments of the invention, the BFMA (140) may be an accounting software, a business tax preparation application, or any other types of business financial management application. In one or more embodiments, the BFMA (140) is provided by an application service provider, such as a software as a service (SaaS). For example, the BFMA (140) may be operated by the application service provider (ASP) and accessed by the businesses (101) on a subscription basis.

In one or more embodiments, the BFMA (140) retrieves the transaction records (e.g., transaction record A (142*a*) of the business A (101*a*), transaction record B (142*b*) of the business B (101*b*)) from financial institutions (e.g., bank, credit card service provider, etc.) used by the businesses (101). In one or more embodiments, the BFMA (140) retrieves the transaction records from financial institutions, as directed by the businesses (101). For example, the PBFMA (140) retrieves the transaction record A (142*a*) of the business A (101*a*) based on a business user input (e.g., during an online banking session to access the financial institutions) of the business A (101*a*). Further, the BFMA (140) stores and organizes the retrieved transaction records under individual financial accounts of the businesses (101). Further, the BFMA (140) stores and organizes the retrieved transaction records as the consumer transaction records under individual financial accounts of the consumers (102). For example, the retrieved transaction records associated with the business A (101a) are stored as the business transaction records A (141a) in a financial account (not shown) of the business A (101a). Similarly, the retrieved transaction records associated with the business B (101b) are stored as the business transaction records B (141b) in a financial account (not shown) of the business B (101b).

In one or more embodiments of the invention, the BFMA (140) is further configured to generate a business user profile for each of the businesses (101). In one or more embodiments, the business user profile includes one or more of an industry category, a store name, a store location, a merchandise inventory list, a consumer list, transaction statistics, and other descriptions of the corresponding business. For example, the BFMA (140) generates the business user profile A (143a) for the business A (101a) based on information provided by the business A (101a) as well as based on the activities of the business A (101a) using the BFMA (140). Similarly, the BFMA (140) generates the business user profile B (143b) for the business B (101b) based on information provided by the business B (101b), as well as based on the activities of the business B (101b) using the BFMA (140).

In one or more embodiments of the invention, the BFMA (140) is further configured to display consumer-initiated messages (e.g., consumer-initiated message (151b)) received from the TCA (150) to target one or more of the businesses (101). For example, the consumer-initiated message (151a) may be sent from the TCA (150) to an instantiation of the BFMA (140) that executes on a computing device of the business A (101a). Accordingly, the consumer-initiated message (151a) is displayed in a user interface window of the BFMA (140) that is displayed on the computing device of the business A (101a). An example of displaying the consumer-initiated message (151a) on the computing device of the business A (101a) is described in reference to FIG. 3.2 below.

In one or more embodiments of the invention, the TCA (150) is a set of software solutions designed to automatically deliver business-initiated messages (e.g., business-initiated message (151a)) to the consumers (102), and consumer-initiated messages (e.g., consumer-initiated message (151b)) to the businesses (101) using the PFMA (160) and the BFMA (140). In one or more embodiments, the TCA (150) includes the business-initiated message analyzer (152) that is configured to send business-initiated messages (e.g., business-initiated message (151a)) to one or more target consumers selected from the consumers (102). In one or more embodiments, the business-initiated message analyzer (152) uses the method described in reference to FIG. 2.1 below to automatically select the one or more target consumers and send the business-initiated messages to the one or more target consumers. In one or more embodiments, the TCA (150) further includes the consumer-initiated message analyzer (153) that is configured to send consumer-initiated messages (e.g., consumer-initiated message (151b)) to one or more target businesses selected from the businesses (101). In one or more embodiments, the consumer-initiated message analyzer (153) uses the method described in reference to FIG. 2.2 below to automatically select the one or more target businesses and send the consumer-initiated messages to the one or more target businesses.

FIG. 2.1 shows a flowchart in accordance with one or more embodiments of the invention. In one or more embodiments of the invention, the method of FIG. 2.1 may be practiced using the system (100) described in reference to FIG. 1 above. In one or more embodiments of the invention, one or more of the steps shown in FIG. 2.1 may be omitted, repeated, and/or performed in a different order than that shown in FIG. 2.1. Accordingly, the specific arrangement of steps shown in FIG. 2.1 should not be construed as limiting the scope of the invention.

Initially in Step 201, a business-initiated message is received from a business. The business-initiated message is generated by the business to selectively target consumers. In particular, the business is one of multiple businesses that conduct financial transactions with the consumers via a commerce platform. Specifically, the financial transactions include payments from the consumers in exchange for goods and services provided by the businesses. In one or more embodiments, the business-initiated message invites a target consumer to engage in an additional financial transaction with the business using the commerce platform. In one or more embodiments, the business-initiated message is sent to multiple target consumers to invite them to engage in additional financial transactions with the business.

In one or more embodiments, the business-initiated message is generated by the business without explicitly specifying any recipient of the business-initiated message. In particular, the recipient of the business-initiated message is automatically determined instead of being explicitly determined by the business. In one or more embodiments, the business-initiated message is generated by the business via a business financial management application (BFMA) used by the businesses to manage the financial transactions. In one or more embodiments, the business-initiated message is generated within a user interface window of an instantiation of the BFMA executing on a computing device of the business, where the user interface window is also used to display consumer-initiated messages from the consumers to the business.

In Step 202, from a personal financial management application (PFMA) used by the consumers to manage the financial transactions, a consumer user profile and consumer transaction records of a consumer are obtained. In one or more embodiments, consumer user profile and consumer transaction records of each of the consumers are obtained for selecting one or more target consumers.

In Step 203, a match is determined by comparing the business-initiated message with respect to the consumer user profile of a particular consumer and the consumer transaction records of the particular consumer. Accordingly, this particular consumer is selected as a target consumer based on the match. In particular, the target consumer is the automatically determined recipient of the business-initiated message.

In one or more embodiments, the consumer user profile of the particular consumer and the business-initiated message are compared based on a pre-determined keyword matching criterion to determine the match. For example, location information (e.g., postal zip code) specified by the business-initiated message is compared with location information included in the consumer user profile to determine the match. In one or more embodiments, a text mining technique is used to extract keywords from the business-initiated message and/or the metadata associated with the business-initiated message. In one or more embodiments, the metadata associated with the business-initiated message includes a list of keywords specified by the business. In particular, the keywords describe the business and/or describe the goods/services offered by the businesses. For example, the keywords may be extracted from the business name, location, and/or merchandise categories included in the business-initiated message and/or the metadata associated with the business-initiated message. The keywords are then compared with the consumer user profile of the particular consumer to determine the match.

In one or more embodiments, the consumer transaction records of the particular consumer are analyzed to generate a statistical measure. The statistical measure and the business-initiated message are then compared based on a pre-determined criterion to determine the match. For example, the statistical measure may be based on the transaction text descriptions and may include frequently found merchandise categories or merchandise categories with a high spending amount. In particular, the number of occurrences of each merchandise category in the consumer transaction records is tallied over a pre-determined time window where categories associated with top n (e.g., top five, top ten, etc.) tallied number of occurrences are included in the statistical measure. Similarly, the spending amount in each merchandise category in the consumer transaction records is tallied over a pre-determined time window where categories associated with top n (e.g., top five, top ten, etc.) tallied spending amounts are included in the statistical measure.

In one or more embodiments, historical consumer-initiated messages previously sent from the particular consumer are identified. The business-initiated message and these historical consumer-initiated messages are then compared to further determine the match. In one or more embodiments, a text mining technique is used to extract keywords from the historical consumer-initiated messages. In particular, the keywords describe the particular consumer's area of interests in goods/services offered from the businesses. For example, the keywords may be extracted from the business name, location, and/or merchandise categories included in the historical consumer-initiated messages. The keywords are then compared with the business-initiated message to determine the match.

In one or more embodiments, the match is determined based on comparing the business-initiated message and one or more of the consumer user profile of the particular consumer, the statistical measure of the particular consumer's consumer transaction records, and the historical consumer-initiated messages previously sent from the particular consumer.

In one or more embodiments, responses of the businesses to historical consumer-initiated messages previously sent from the particular consumer are analyzed to generate a consumer score of the particular consumer. For example, the responses may be indicated by a rate (referred to as the conversion rate) of the business engaging in an additional financial transaction with the particular consumer over the number of times the historical consumer-initiated messages was sent from the consumer. In one or more embodiments, the consumer score is proportional to the conversion rate. In other words, the consumer score is higher if the businesses have responded favorably to the historical consumer-initiated messages from the particular consumer. Accordingly, sending the business-initiated message to the consumer via the PFMA is qualified based on the consumer score. For example, the business-initiated message is sent to a target consumer only if the target consumer's consumer score exceeds a pre-determined minimum threshold.

In one or more embodiments, multiple consumers are selected as target consumers based on their respective matches determined as described above.

In Step 204, the business-initiated message is sent to the target consumer via the PFMA based on the match determined in Step 203. In one or more embodiments, the business-initiated message is sent to the target consumer via the PFMA within a pre-determined time period from the business generating the business-initiated message. In other words, the business-initiated message is sent to the target consumer in real time. In one or more embodiments, the business-initiated message is sent to multiple target consumers via the PFMA based on their respective matches determined in Step 203.

In Step 205, the business-initiated message is displayed to the target consumer using the PFMA. In one or more embodiments, the business-initiated message is displayed to the target consumer via the PFMA within a pre-determined time period from the business generating the business-initiated message. In other words, the business-initiated message is displayed to the target consumer in real time.

In one or more embodiments, the business-initiated message is displayed within a user interface window of an instantiation of the PFMA executing on a computing device of the target consumer, where the user interface window is also used to generate consumer-initiated messages by the consumer to target the businesses.

In one or more embodiments, the business-initiated message is displayed to multiple target consumers, via the PFMA, based on their respective matches determined in Step 203.

In Step 206, an indication is received indicating that the target consumer engages in an additional financial transaction with the business in response to viewing the business-initiated message. In other words, the target consumer has accepted the invitation in the business-initiated message to purchase goods and/or services from the business.

FIG. 2.2 shows a flowchart in accordance with one or more embodiments of the invention. In one or more embodiments of the invention, the method of FIG. 2.2 may be practiced using the system (100) described in reference to FIG. 1 above. In one or more embodiments of the invention, one or more of the steps shown in FIG. 2.2 may be omitted, repeated, and/or performed in a different order than that shown in FIG. 2.2. Accordingly, the specific arrangement of steps shown in FIG. 2.2 should not be construed as limiting the scope of the invention.

Initially in Step 211, a consumer-initiated message is received from a consumer. The consumer-initiated message is generated by the consumer to selectively target businesses. In particular, the consumer is one of multiple consumers that conduct financial transactions with the businesses via a commerce platform. Specifically, the financial transactions include payments from the consumers in exchange for goods and services provided by the businesses. In one or more embodiments, the consumer-initiated message invites a target business to engage in an additional financial transaction with the consumer using the commerce platform. In one or more embodiments, the consumer-initiated message is sent to multiple target businesses to invite them to engage in additional financial transactions with the consumer.

In one or more embodiments, the consumer-initiated message is generated by the consumer without explicitly specifying any recipient of the consumer-initiated message. In particular, the recipient of the consumer-initiated message is automatically determined instead of being explicitly determined by the consumer. In one or more embodiments, the consumer-initiated message is generated by the consumer via a personal financial management application (PFMA) used by the consumers to manage the financial transactions. In one or more embodiments, the consumer-initiated message is generated within a user interface window of an instantiation of the PFMA executing on a computing device of the consumer, where the user interface window is also used to display business-initiated messages from the businesses to the consumer.

In Step 212, from a business financial management application (BFMA) used by the businesses to manage the financial transactions, a business user profile and business transaction records of a business are obtained. In one or more embodiments, business user profile and business transaction records of each of the businesses are obtained for selecting one or more target businesses.

In Step 213, a match is determined by comparing the consumer-initiated message with respect to the business user profile of a particular business and the business transaction records of the particular business. Accordingly, this particular business is selected as a target business based on the match. In particular, the target business is the automatically determined recipient of the consumer-initiated message.

In one or more embodiments, the business user profile of the particular business and the consumer-initiated message are compared based on a pre-determined keyword matching criterion to determine the match. For example, location information (e.g., postal zip code) specified by the consumer-initiated message is compared with location information included in the business user profile to determine the match. In one or more embodiments, a text mining technique is used to extract keywords from the consumer-initiated message and/or the metadata associated with the consumer-initiated message. In one or more embodiments, the metadata associated with the consumer-initiated message includes a list of keywords specified by the consumer. In particular, the keywords describe the consumer and/or describe the goods/services sought by the consumers. For example, the keywords may be extracted from the business name, location, merchandise name, and/or merchandise categories included in the consumer-initiated message and/or the metadata associated with the consumer-initiated message. The keywords are then compared with the business user profile of the particular business to determine the match.

In one or more embodiments, the business transaction records of the particular business are analyzed to generate a statistical measure. The statistical measure and the consumer-initiated message are then compared based on a pre-determined criterion to determine the match. For example, the statistical measure may be based on the transaction text descriptions and may include frequently found merchandise categories or merchandise categories with high spending amount. In particular, the number of occurrences of each merchandise category in the business transaction records is tallied over a pre-determined time window, where categories associated with top n (e.g., top five, top ten, etc.) tallied number of occurrences are included in the statistical measure. Similarly, the spending amount in each merchandise category in the business transaction records is tallied over a pre-determined time window where categories associated with top n (e.g., top five, top ten, etc.) tallied spending amount are included in the statistical measure.

In one or more embodiments, historical business-initiated messages previously sent from the particular business are identified. The consumer-initiated message and these historical business-initiated messages are then compared to further determine the match. In one or more embodiments, a text mining technique is used to extract keywords from the historical business-initiated messages. In particular, the keywords describe the particular business's priority and/or focus in goods/services offered to the consumers. For example, the keywords may be extracted from the location, merchandise name, and/or merchandise categories included in the historical business-initiated messages. The keywords are then compared with the consumer-initiated message to determine the match.

In one or more embodiments, the match is determined based on comparing the consumer-initiated message and one or more of the business user profile of the particular business, the statistical measure of the particular business's business transaction records, and the historical business-initiated messages previously sent from the particular business.

In one or more embodiments, responses of the consumers to historical business-initiated messages previously sent from the particular business are analyzed to generate a business score of the particular business. For example, the responses may be indicated by a rate (referred to as the conversion rate) of the consumer engaging in an additional financial transaction with the particular business over the number of times the historical business-initiated messages were sent from the business. In one or more embodiments, the business score is proportional to the conversion rate. In other words, the business score is higher if the consumers have responded favorably to the historical business-initiated messages from the particular business. Accordingly, sending the consumer-initiated message to the business via the PFMA is qualified based on the business score. For example, the consumer-initiated message is sent to a target business only if the target business's business score exceeds a pre-determined minimum threshold. In one or more embodiments, multiple businesses are selected as target businesses based on their respective matches determined as described above.

In Step 214, the consumer-initiated message is sent to the target business via the BFMA based on the match determined in Step 213. In one or more embodiments, the consumer-initiated message is sent to the target business via the BFMA within a pre-determined time period from the consumer generating the consumer-initiated message. In other words, the consumer-initiated message is sent to the target business in real time. In one or more embodiments, the consumer-initiated message is sent to multiple target businesses via the BFMA based on their respective matches determined in Step 213.

In Step 215, the consumer-initiated message is displayed to the target business using the BFMA. In one or more embodiments, the consumer-initiated message is displayed to the target business via the BFMA within a pre-determined time period from the consumer generating the consumer-initiated message. In other words, the consumer-initiated message is displayed to the target business in real time.

In one or more embodiments, the consumer-initiated message is displayed within a user interface window of an instantiation of the BFMA executing on a computing device of the target business, where the user interface window is also used to generate business-initiated messages by the business to target the consumers.

In one or more embodiments, the consumer-initiated message is displayed to multiple target businesses via the BFMA based on their respective matches determined in Step 213.

In Step 216, an indication is received indicating that the target business engages in an additional financial transaction with the consumer in response to viewing the consumer-initiated message. In other words, the target business has accepted the invitation in the consumer-initiated message to purchase goods and/or services from the consumer.

FIGS. 3.1, 3.2, 3.3, and 3.4 show an example in accordance with one or more embodiments of the invention. Specifically, FIGS. 3.1, 3.2, 3.3, and 3.4 show example screenshots of a business financial management application (BFMA) and a personal financial management application (PFMA). Although the example shown in FIGS. 3.1, 3.2, 3.3, and 3.4 refers to specific numbers of elements (e.g., the number of transaction records and alert messages), one or more of the elements shown in FIGS. 3.1, 3.2, 3.3, and 3.4 may be omitted, repeated, substituted, and/or shown in different numbers. Accordingly, embodiments of the invention should not be considered limited to the specific arrangements of elements shown in FIGS. 3.1, 3.2, 3.3, and 3.4.

In the example shown in FIGS. 3.1, 3.2, 3.3, and 3.4, a message is referred to as an advertisement or ad. An ad template is defined for the business-initiated message and the consumer initiated message. In this manner, every ad sender (e.g., a consumer or a business) can use a unified presentation. The ad template is a user interface (UI) where ad senders can type their ads. Their ads will be written into an ad database. The ads sharing system (i.e., targeted communication application shown in FIG. 1 above) then conduct a data analysis to match a business ad to consumers, or match a consumer ad to small businesses. The matching results will be written to the result database. First, location information (e.g., zip code) is used for matching. Then, text mining is used to match the keywords in the ad template to a set of keywords describing a consumer or small businesses. The set of keywords can be extracted from the business name, location, transaction text description or categories most spent for both businesses and consumers. Accordingly, the ads sharing system finds a set of target consumers for a particular ad from a small business, as well as finds a set of target small businesses for a particular ad from a consumer.

FIG. 3.1 shows an example where consumers (311) use the personal financial management application (PFMA), such as Mint®, TurboTax®, Quicken® to manage their financial activities. For example, the user profile (313) (i.e., consumer user profile as defined above) is generated by the PFMA for a particular consumer based on the information provided by the particular consumer and/or based on information extracted from the transaction records maintained by the PFMA for the particular consumer. The small business (312) "Xanh Restaurant" uses the business financial management application (BFMA), such as QuickBooks®, or a payroll application to manage their business activities. In particular, the business profile (314) (i.e., business user profile as defined above) is generated by the BFMA for Xanh Restaurant based on the information provided by the restaurant owner and/or based on information extracted from the transaction records maintained by the BFMA for Xanh Restaurant. The restaurant owner fills out the ad template (315) using the BFMA. An ad is automatically generated by the BFMA based on the ad template (315). For example, the ad may be a concatenation of the business name and the message listed in the ad template (315), i.e., "Xanh restaurant offers 10% off lunch Monday-Friday." The ads sharing system delivers the ad to one or more target consumers selected from the consumers (311). For example, the consumer, whose user profile (313) is well matched by keywords extracted from the automatically generated ad or the ad template (315), receives the ad from Xanh Restaurant. In particular, the user profile (313) indicates that this consumer spends a high amount in zip code 94041, matching the zip code in the ad template (315). In addition, the top vendor name listed in the user profile (313) also matches the business name listed in the ad template (315). Once delivered, the ad may be displayed to the target consumer in a UI window of the PFMA executing on a computing device of the target consumer. When there are multiple ads delivered to the same target consumer, the ads will be displayed in an order ranked by a degree of keyword matching. For example, the more the keywords are matched, the higher the ad is ranked.

FIG. 3.2 shows an example screenshot A (320) of the UI window of the PFMA that displays the ad described in FIG. 3.1. Specifically, the screenshot A (320) is generated by the PFMA Mint.com for the consumer "Chris Sanders" identified by his email address chriss@123.com. As shown in FIG. 3.2, the screenshot A (320) includes transaction records (321) representing purchases made by Chris and an ad window (322) displaying the ad described in FIG. 3.1 above. Although not explicitly shown, the ad window (322) may be expanded to display an ad template allowing Chris to generate a consumer-initiated message. An example of generating and automatically delivering such consumer-initiated message for Chris is described in FIGS. 3.3 and 3.4 below.

FIG. 3.3 shows an example of delivering a consumer-initiated message from the consumer Chris (331), who is the "Chris Sanders" described in FIG. 3.2 above. As shown in FIG. 3.3, the user profile (333) of the consumer Chris (331) is essentially the same as the user profile (313) shown in FIG. 3.1 above. The small business (332), "Joe's Garden Services", is one of the consumers (312) shown in FIG. 3.1 above. In particular, the business profile (334) is generated by the BFMA for Joe's Garden Services based on the information provided by the owner Joe, and/or based on information extracted from the transaction records maintained by the BFMA for Joe's Garden Services. The consumer Chris (331) fills out the ad template (335) using the PFMA. An ad is automatically generated by the PFMA based on the ad template (335). For example, the ad may be a concatenation of the cost and the message listed in the ad template (335), i.e., "I need a gardener for $40/hour." The ads sharing system delivers the ad to one or more target businesses selected from businesses located in the zip code 94085 as specified by the location information in the ad template (335). For example, Joe's Garden Services whose business profile (334) is well matched by keywords extracted from the automatically generated ad or the ad template (335), receives the ad from Chris. In particular, the business profile (334) indicates a cost range of $30-80/hour, matching the $40/hour cost figure in the ad template (335). Once delivered, the ad may be displayed to the owner Joe in a UI window of the BFMA executing on a computing device of the owner Joe. When there are multiple ads delivered to the owner Joe, the ads will be displayed in an order ranked by a degree of keyword matching, as described later in this disclosure.

FIG. 3.4 shows an example screenshot B (340) of the UI window of the BFMA that displays the ad described in FIG. 3.3. Specifically, the screenshot B (340) is generated by the BFMA QuickBooks for the small business small business "Joe's Garden Services." As shown in FIG. 34, the screenshot B (340) includes transaction records (341) representing sales made by Joe's Garden Services and ad window (322) displaying the ad A (343a) described in FIG. 3.2 above. In addition, the ad window (342) also displays the ad AB (343b) ranked lower than the ad A (343a). For example, the ad AB (343b) has less matching keywords than the ad A (343a). Although not explicitly shown, the ad window (342) may be expanded to display an ad template allowing the owner Joe to generate a business-initiated message. An example of generating and automatically delivering such business-initiated message has been described in FIGS. 3.1 and 3.2 above.

Further to the example described above, several schemes may be employed to limit the number of ads displayed to an ad receiver so that the ads are not overwhelming. These schemes include:

(i) Ads ranking: If multiple ads are matched to an ad receiver (e.g., based on cost, time, location and category), the ads are ranked based on the degree of keyword matching More keywords are matched, the ad is ranked higher.

(ii) Ads probabilistic random rotation: Every day, a small number of ads are displayed based on random selection of the matched ads. Furthermore, the ads ranked higher are selected with higher probability.

(iii) A reputation score for each ad sender: The reputation score is set equal for every ad sender at the beginning, and gradually tuned by the ad receiver responses, e.g., click-through rates from the ad receivers.

For example, say Chris sends an ad with very low salary for gardener, few businesses would click it because of the low-price. In that case, Chris's reputation score (i.e., consumer score as defined above) is reduced.

In another example, the reputation score of a business may be defined as the ratio of the number of clicks over the number of impressions, that is, number of ad receivers clicking the ad, divided by the number of ad receivers receiving the ad.

Since an ad sender can send multiple ads $A\_1, A\_2, A\_3, \ldots A\_i$ (ordered chronologically by the index i based on the time of ad sending), the reputation score $R'\_i$ may be calculated as below:

When $i>1$: $R'\_i=0.2*R\_i+0.8*R'\_(i-1)$
When $i=1$: $R'\_1=R\_1$ where $R\_i=\#clicks/\#impressions$ for ad $A\_i$, $R'\_i$ is the reputation score calculated based on all $A\_i$ and all previous Ads sent prior to $A\_i$.

For example, a business first send ad $A\_1$ which has 100 impressions and 1 click, and then send ad $A\_2$ with 100 impressions and 2 click, then ad $A\_3$ with 100 impressions and 3 clicks. The reputation score $R'\_i$ may be calculated as below:

$R\_1=1\%, R\_2=2\%, R\_3=3\%$
$R'\_1=1\%$;
$R'\_2=0.2*R\_2+0.8*R'\_1=0.4\%+0.8\%=1.2\%$
$R'\_3=0.2*R\_3+0.8*R'\_2=0.6\%+0.96\%=1.56\%$

Since the reputation score is a number between 0 and 1, the reputation score may be used to control the ad receiver population. When a sender's ad is matched to X receivers, the maximal number of ad receivers may be limited by X times the reputation score. Therefore, the higher the reputation score an ad sender has, the more ad receivers will receive the ad from the ad sender.

Figure 4:
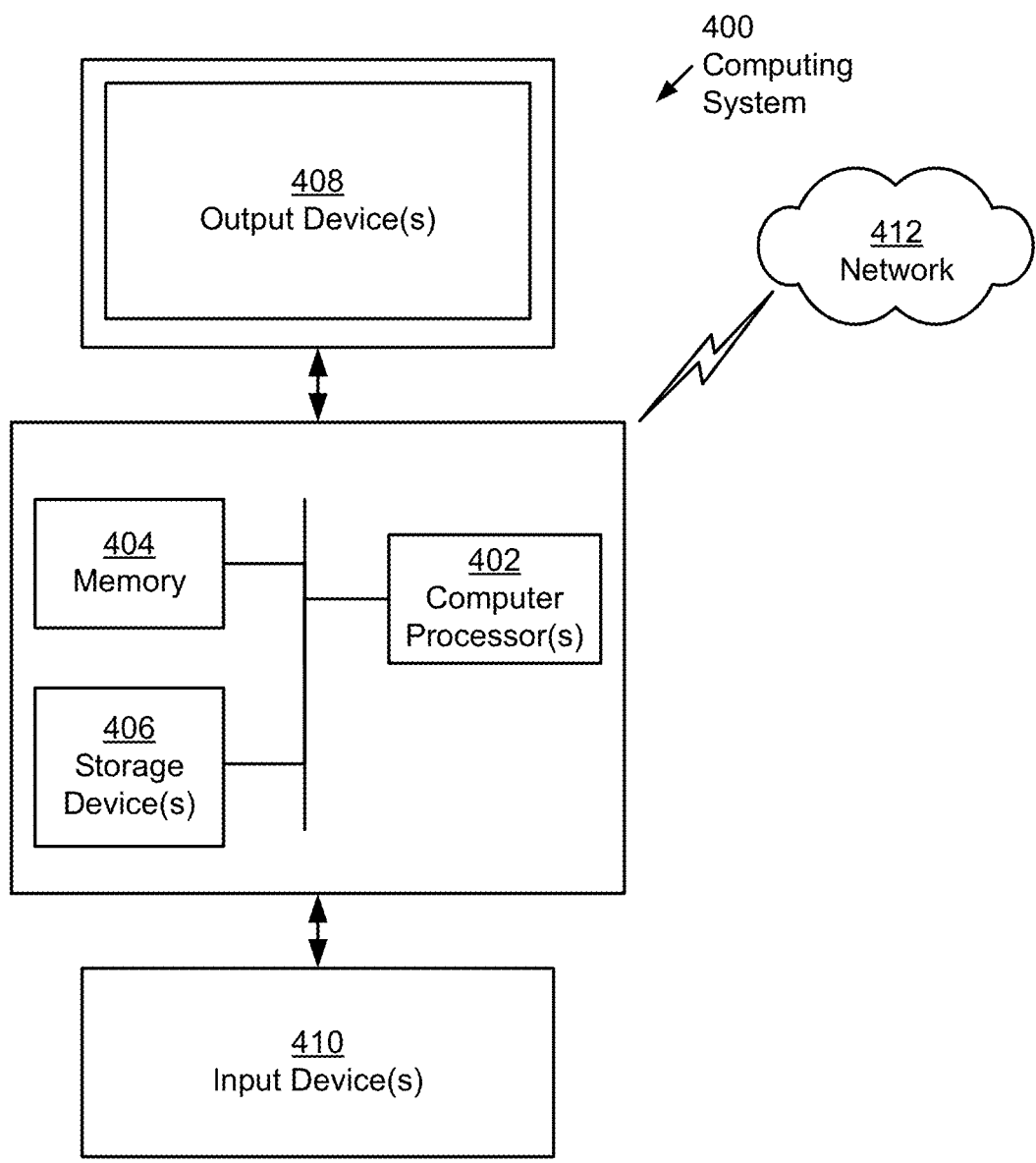
FIG. 4 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for targeted communication, comprising:
    a computer processor;
    a commerce platform configured to perform a plurality of financial transactions, wherein the plurality of financial transactions comprises payments from a plurality of consumers in exchange for goods and services provided by a plurality of businesses;

a financial management server separate from the commerce platform and comprising:
  a personal financial management application (PFMA) used by the plurality of consumers, when executed causing the computer processor to:
  generate a consumer user profile for each of the plurality of consumers,
  access, based on a consumer user input from a consumer of the plurality of consumers, consumer transaction records representing a portion of the financial transactions associated with the consumer, and
  display, to the consumer, a business-initiated message received from a targeted communication application (TCA);
  a business financial management application (BFMA) used by the plurality of businesses, when executed causing the computer processor to:
    generate a business user profile for each of the plurality of businesses, access, based on a business user input from a business of the plurality of businesses, business transaction records representing a portion of the financial transactions associated with the business, and
    display, to the business, a consumer-initiated message received from the TCA,
    wherein the PFMA communicates with the BFMA through the TCA;
  wherein the TCA when executed causing the computer processor to enable targeted communication between the PFMA and the BFMA on the financial management server by causing the computer processor to:
    receive, from the business, the business-initiated message that is generated by the business to selectively target the plurality of consumers;
    determine a first match by comparing the business-initiated message with respect to the consumer user profile of the consumer and the consumer transaction records of the consumer, wherein this comparing includes tallying occurrences of frequently-found merchant categories in the consumer transaction records over a first pre-determined time window;
    send the business-initiated message to the consumer via the PFMA based on the first match, wherein the business-initiated message invites the consumer to engage in a first additional financial transaction with the business using the commerce platform;
    receive, from the consumer, the consumer-initiated message that is generated by the consumer to selectively target the plurality of businesses;
    determine a second match by comparing the consumer-initiated message with respect to the business user profile of the business and the business transaction records of the business, wherein this comparing includes tallying spending amounts in the frequently-found merchant categories in the business transaction records over a second pre-determined time window;
    send the consumer-initiated message to the business via the BFMA based on the second match, wherein the consumer-initiated message invites the business to engage in a second additional financial transaction with the consumer using the commerce platform,
    wherein sending the consumer-initiated message to the business via the BFMA is further based on a reputation score of the consumer multiplied by a maximal number of matched businesses and wherein the reputation score is a number between 0 and 1 resulting from a click-through rate associated with one or more previous consumer-initiated messages;
  and
  a repository for storing:
    a plurality of business-initiated messages from the plurality of businesses, and
    a plurality of consumer-initiated messages from the plurality of consumers.

2. The system of claim 1,
wherein the business-initiated message is sent to the consumer via the PFMA within a pre-determined time period from the business generating the business-initiated message, and
wherein the consumer-initiated message is sent to the business via the BFMA within the pre-determined time period from the consumer generating the consumer-initiated message.

3. The system of claim 1, the TCA when executed further causing the computer processor to:
analyze responses of the plurality of businesses to a portion of the plurality of consumer-initiated messages from the consumer to generate a consumer score of the consumer,
wherein the consumer score is proportional to a conversion rate associated with these responses, and wherein sending the business-initiated message to the consumer via the PFMA is further based on the consumer score.

4. The system of claim 1, the TCA when executed further causing the computer processor to:
analyze responses of the plurality of consumers to a portion of the plurality of business-initiated messages from the business to generate a business score of the business, wherein the business score is proportional to a conversion rate associated with these responses, and wherein sending the consumer-initiated message to the business via the BFMA is further based on the business score.

5. The system of claim 1, TCA when executed further causing the computer processor to:
identify a portion of the plurality of consumer-initiated messages from the consumer,
wherein determining the first match is further by comparing the business-initiated message and the portion of the plurality of consumer-initiated messages.

6. A method for targeted communication, comprising:
receiving, by a targeted communication application (TCA) executing on a computer processor and from a business of a plurality of businesses, a business-initiated message that is generated by the business to selectively target a plurality of consumers, wherein the plurality of businesses and the plurality of consumers conduct a plurality of financial transactions using a commerce platform, wherein the plurality of financial transactions comprise payments from the plurality of consumers in exchange for goods and services provided by the plurality of businesses;
obtaining, by the TCA executing on the computer processor and from a personal financial management application (PFMA) used by the plurality of consumers to manage the plurality of financial transactions, a consumer user profile and consumer transaction records of a consumer of the plurality of consumers;

determining, by the TCA, a first match by the computer processor comparing the business-initiated message with respect to the consumer user profile of the consumer and the consumer transaction records of the consumer, wherein this comparing includes tallying occurrences of frequently-found merchant categories in the consumer transaction records over a first pre-determined time window;

sending, by the TCA, the business-initiated message to the consumer via the PFMA based on the first match, wherein the business-initiated message invites the consumer to engage in a first additional financial transaction with the business using the commerce platform;

receiving, by the TCA from the consumer, a consumer-initiated message that is generated by the consumer to selectively target the plurality of businesses;

obtaining, by the TCA from a business financial management application (BFMA) used by the plurality of business to manage the financial transactions, a business user profile and business transaction records of a business of the plurality of businesses;

wherein the PFMA communicates with the BFMA through the TCA;

determining, by the TCA, a second match by comparing the consumer-initiated message with respect to the business user profile of the business and the business transaction records of the business, wherein this comparing includes tallying spending amounts in the frequently-found merchant categories in the business transaction records over a second pre-determined time window;

sending, by the TCA, the consumer-initiated message to the business via the BFMA based on the second match, wherein the consumer-initiated message invites the business to engage in a second additional financial transaction with the consumer using the commerce platform; and wherein sending the consumer-initiated message to the business via the BFMA is further based on a reputation score of the consumer multiplied by a maximal number of matched businesses and wherein the reputation score is a number between 0 and 1 resulting from a click-through rate associated with one or more previous consumer-initiated messages.

7. The method of claim 6, further comprising:
displaying, using the PFMA, the business-initiated message to the consumer; and
displaying, using the BFMA, the consumer-initiated message to the business;
wherein the business-initiated message is sent to the consumer via the PFMA within a pre-determined time period from the business generating the business-initiated message, and
wherein the consumer-initiated message is sent to the business via the BFMA within the pre-determined time period from the consumer generating the consumer-initiated message.

8. The method of claim 6, further comprising:
analyzing responses of the plurality of businesses to historical consumer-initiated messages previously sent from the consumer to generate a consumer score of the consumer, wherein the consumer score is proportional to a conversion rate associated with these responses, and wherein sending the business-initiated message to the consumer via the PFMA is further based on the consumer score.

9. The method of claim 6, further comprising:
analyzing responses of the plurality of consumers to historical business-initiated messages previously sent from the business to generate a business score of the business, wherein the business score is proportional to a conversion rate associated with these responses, and wherein sending the consumer-initiated message to the business via the BFMA is further based on the business score.

10. The method of claim 6, further comprising:
identifying historical consumer-initiated messages previously sent from the consumer,
wherein determining the first match is further by comparing the business-initiated message and the historical consumer-initiated messages.

11. A non-transitory computer readable medium storing instructions for targeted communication, the instructions, when executed by a computer processor, comprising functionality for:

receiving, by a targeted communication application (TCA) from a business of a plurality of businesses, a business-initiated message that is generated by the business to selectively target a plurality of consumers, wherein the plurality of businesses and the plurality of consumers conduct a plurality of financial transactions using a commerce platform, wherein the plurality of financial transactions comprise payments from the plurality of consumers in exchange for goods and services provided by the plurality of businesses;

obtaining, by the TCA from a personal financial management application (PFMA) used by the plurality of consumers to manage the plurality of financial transactions, a consumer user profile and consumer transaction records of a consumer of the plurality of consumers;

determining, by the TCA, a first match by comparing the business-initiated message with respect to the consumer user profile of the consumer and the consumer transaction records of the consumer, wherein this comparing includes tallying occurrences of frequently-found merchant categories in the consumer transaction records over a first pre-determined time window;

sending, by the TCA, the business-initiated message to the consumer via the PFMA based on the first match, wherein the business-initiated message invites the consumer to engage in a first additional financial transaction with the business using the commerce platform;

receiving, by the TCA, from the consumer, a consumer-initiated message that is generated by the consumer to selectively target the plurality of businesses;

obtaining, by the TCA, from a business financial management application (BFMA) used by the plurality of business to manage the financial transactions, a business user profile and business transaction records of a business of the plurality of businesses;

wherein the PFMA communicates with the BFMA through the TCA;

determining, by the TCA, a second match by comparing the consumer-initiated message with respect to the business user profile of the business and the business transaction records of the business, wherein this comparing includes tallying spending amount in the frequently-found merchant categories in the business transaction records over a second pre-determined time window;

sending, by the TCA, the consumer-initiated message to the business via the BFMA based on the second match, wherein the consumer-initiated message invites the business to engage in a second additional financial transaction with the consumer using the commerce platform;

wherein sending the consumer-initiated message to the business via the BFMA is further based on a reputation score of the consumer multiplied by a maximal number of matched businesses and wherein the reputation score is a number between 0 and 1 resulting from a click-through rate associated with one or more previous consumer-initiated messages.

12. The non-transitory computer readable medium of claim 11, the instructions, when executed by the computer processor, further comprising functionality for:

displaying, using the PFMA, the business-initiated message to the consumer; and displaying, using the BFMA, the consumer-initiated message to the business;

wherein the business-initiated message is sent to the consumer via the PFMA within a pre-determined time period from the business generating the business-initiated message, and wherein the consumer-initiated message is sent to the business via the BFMA within the pre-determined time period from the consumer generating the consumer-initiated message.

13. The non-transitory computer readable medium of claim 11, the instructions, when executed by the computer processor, further comprising functionality for:

analyzing responses of the plurality of businesses to historical consumer-initiated messages previously sent from the consumer to generate a consumer score of the consumer, wherein the consumer score is proportional to a conversion rate associated with these responses, and wherein sending the business-initiated message to the consumer via the PFMA is further based on the consumer score.

14. The non-transitory computer readable medium of claim 11, the instructions, when executed by the computer processor, further comprising functionality for:

analyzing responses of the plurality of consumers to historical business-initiated messages previously sent from the business to generate a business score of the business, wherein the business score is proportional to a conversion rate associated with these responses, and wherein sending the consumer-initiated message to the business via the BFMA is further based on the business score.

15. The non-transitory computer readable medium of claim 11, the instructions, when executed by the computer processor, further comprising functionality for:

identifying historical consumer-initiated messages previously sent from the consumer, wherein determining the first match is further by comparing the business-initiated message and the historical consumer-initiated messages.

* * * * *